(12) United States Patent
Oh et al.

(10) Patent No.: US 10,744,945 B2
(45) Date of Patent: Aug. 18, 2020

(54) BACKLIGHT UNIT AND METHOD FOR PRODUCING SAME

(71) Applicant: MEEKYUNGTEC CO., LTD, Gyeonggi-do (KR)

(72) Inventors: Se-Been Oh, Gyeonggi-do (KR); Seung-Zu Young, Gyeonggi-do (KR)

(73) Assignee: MEEKYUNGTEC CO., LTD, Gyeonggi-do (KR)

( * ) Notice: Subject to any disclaimer, the term of this patent is extended or adjusted under 35 U.S.C. 154(b) by 0 days.

(21) Appl. No.: 16/308,283

(22) PCT Filed: Jun. 26, 2017

(86) PCT No.: PCT/KR2017/006730
§ 371 (c)(1),
(2) Date: Dec. 7, 2018

(87) PCT Pub. No.: WO2017/213484
PCT Pub. Date: Dec. 14, 2017

(65) Prior Publication Data
US 2019/0135182 A1 May 9, 2019

(30) Foreign Application Priority Data
Jun. 10, 2016 (KR) .................... 10-2016-0072565

(51) Int. Cl.
*B60R 1/06* (2006.01)
*G02B 27/14* (2006.01)
(Continued)

(52) U.S. Cl.
CPC .............. *B60R 1/06* (2013.01); *B60Q 1/2665* (2013.01); *B60R 1/08* (2013.01); *B60R 1/12* (2013.01);
(Continued)

(58) Field of Classification Search
CPC ............ G02B 6/000091; G02B 6/0093; G02F 1/133308; G02F 1/133311; G02F 1/133615; G02F 2001/133314
See application file for complete search history.

(56) References Cited

U.S. PATENT DOCUMENTS

| 5,886,759 A * | 3/1999 | Mashino | ................ | G01D 11/28 |
| | | | | 349/113 |
| 8,047,668 B2 * | 11/2011 | Chang | .................. | G02B 6/0083 |
| | | | | 362/217.11 |

(Continued)

FOREIGN PATENT DOCUMENTS

| CN | 1348114 A | 5/2002 |
| CN | 1487336 A | 4/2004 |

(Continued)

OTHER PUBLICATIONS

Office Action issued by the Japanese Patent Office dated Oct. 15, 2019.

(Continued)

*Primary Examiner* — Julie A Bannan
(74) *Attorney, Agent, or Firm* — IP & T Group LLP

(57) ABSTRACT

The present invention relates to a backlight unit (10) for an outside mirror of an automobile, comprising: a case (20) provided with an inner space for accommodating a stacked assembly (95) of components, and having a side opening (22) through which the stacked assembly (95) can be inserted; and a light source unit (30) mounted into the inner space of the case (20) and capable of emitting light when power is supplied, wherein the stacked assembly (95) comprises: a light guide plate (40) for diffusing, across the entire area thereof, the light emitted from the light source unit; and a reflection plate (50) stacked on the rear surface of the light guide plate and reflecting, to the front surface of the light (Continued)

guide plate, the light emitted from the rear surface of the light guide plate.

8 Claims, 6 Drawing Sheets

(51) Int. Cl.
*B60R 1/12* (2006.01)
*B60Q 1/26* (2006.01)
*B60R 1/08* (2006.01)

(52) U.S. Cl.
CPC ............ *B60R 1/1207* (2013.01); *G02B 27/14* (2013.01); *B60R 2001/1223* (2013.01)

(56) References Cited

U.S. PATENT DOCUMENTS

| | | | |
|---|---|---|---|
| 2002/0093811 A1 | 7/2002 | Chen | |
| 2002/0113919 A1 | 8/2002 | Liu et al. | |
| 2011/0149594 A1* | 6/2011 | Terajima | G02F 1/133603 362/606 |
| 2014/0362325 A1* | 12/2014 | Lee | G02F 1/133308 349/58 |
| 2015/0124483 A1* | 5/2015 | Lee | G02F 1/133608 362/612 |
| 2016/0154163 A1* | 6/2016 | Jang | G02B 6/0053 362/19 |
| 2016/0223739 A1* | 8/2016 | Yoon | G02B 6/0088 |

FOREIGN PATENT DOCUMENTS

| | | |
|---|---|---|
| CN | 1766705 A | 5/2006 |
| CN | 101013213 A | 8/2007 |
| CN | 106292021 A | 1/2017 |
| JP | 2004-77955 | 3/2004 |
| JP | 2015-170597 A | 9/2015 |
| KR | 1020040018194 | 3/2004 |
| KR | 1020060134539 | 12/2006 |
| KR | 1020080108753 | 12/2008 |
| KR | 1020130131702 | 12/2013 |
| KR | 101526792 | 6/2015 |

OTHER PUBLICATIONS

Notice of Allowance issued by the Japan Patent Office dated Mar. 17, 2020.
Office action issued by the China National Intellectual Property Administration dated Nov. 25, 2019.

* cited by examiner

BACKLIGHT UNIT AND METHOD FOR PRODUCING SAME

This application is a national stage application of PCT/KR2017/006730 filed on Jun. 26, 2017, which claims priority of Korean patent application number 10-2016-0072565 filed on Jun. 10, 2016. The disclosure of each of the foregoing applications is incorporated herein by reference in its entirety.

BACKGROUND

1. Field

The present invention relates to a backlight unit for an outside mirror of a vehicle and method for manufacturing the same.

2. Discussion of the Related Art

A BSD (Blind Spot Detection) system is a warning system that detects a vehicle located in a blind spot on the rear side of a vehicle and provides information about it for the driver while driving. Such a BSD system is provided with a backlight unit installed inside an outside mirror of a vehicle. The backlight unit is attached to the rear surface of the glass in which an indicator icon is etched.

With respect to the conventional technology for such a backlight unit, for example, Korean Patent No. 10-1526792 (published on May 6, 2015) will be described as follows.

FIG. 1 is a perspective view of the backlight unit for an outside mirror according to the prior art. FIG. 2 is an exploded perspective view of the backlight unit for an outside mirror according to the prior art. FIG. 3 is a cross-sectional view of the backlight unit for an outside mirror according to the prior art.

Referring to FIGS. 1 to 3, the backlight unit 100 according to the prior art comprises a bottom case 110, an LED (Light Emitting Diode) 121 mounted on a PCB (Printed Circuit Board) 122, a light source unit 120 placed at an inner lower side of the bottom case 100, a light guide plate 130 placed at an inner upper side, a reflection plate 150 placed behind the light guide plate 130, a prism plate 140 placed in front of the light guide plate 130, a diffuser sheet 160 placed in front of the prism plate 140, and a top case 180 fixed to the bottom case 110 by ultrasonic welding.

According to the conventional backlight unit 100 configured as described above, the component parts 120, 121, 122, 130, 140, 150 and 160 are mounted through the front opening of the bottom case 100, then the top case 100 and the bottom case 180 must be fixed using ultrasonic welding.

However, ultrasonic welding is a method of converting electric energy into mechanical energy by inputting an AC power of 50-60 Hz into a vibrator through an oscillator, and then causing instantaneous friction on the joint surface of the workpieces through a horn to fuse and bond them. Therefore, when the PCB 122 is mounted on the bottom case 100 and then the top case 180 and the bottom case 100 are fixed together by ultrasonic welding, fine cracks may occur in a soldering portion between the PCB 122 and the electronic device due to the impact due to the mechanical vibration generated in the ultrasonic welding process. As a result, when the backlight unit 100 is mounted on and used in an outside mirror of a vehicle, the fine cracks gradually expand due to continuous vibration in vehicle operation. Eventually, a progressive breakage occurs in which the electronic device is detached from the PCB 122, so that the backlight unit 100 cannot exhibit its original function.

SUMMARY

Therefore, it is an object of the present invention, which is intended to solve the problems of the prior art, to provide a backlight unit which can prevent fine cracks in a soldering portion between a PCB and an electronic device during an ultrasonic welding process, and progressive breakage of the backlight unit in advance.

In an aspect of the present invention, a backlight unit comprises: a case provided with an inner space for accommodating a stacked assembly of components, and having a side opening through which the stacked assembly can be inserted; and a light source unit mounted into the inner space of the case and capable of emitting light when power is supplied, wherein the stacked assembly may comprise: a light guide plate for diffusing, the light emitted from the light source unit across the entire area thereof; and a reflection plate stacked on the rear surface of the light guide plate and reflecting, the light emitted from the rear surface of the light guide plate toward the front surface of the light guide plate.

The backlight unit may further comprise a sealing material sealing the side opening of the case.

The stacked assembly may further comprise a prism plate stacked on the front surface of the light guide plate and increasing a surface luminance of light emitted from the front surface of the light guide plate.

The stacked assembly may further comprise a diffusion plate stacked on the front surface of the light guide plate and uniformly diffusing light emitted from the front surface of the light guide plate.

The backlight unit may further comprise a reflective tape adhered to an edge of the light guide plate and reflecting light emitted from the edge of the light guide plate.

The backlight unit may further comprise a window formed integrally with the case on the front surface of the case by a double injection manner.

The light source unit may comprise a PCB (Printed Circuit Board) and at least one light source mounted on the PCB, and the light source may be configured to radiate light in a direction perpendicular to the plane of the PCB.

The light source unit may comprise a PCB and at least one light source mounted on the PCB, and the light source may be configured to radiate light in a direction parallel to the plane of the PCB, and at least one hole for receiving the at least one light source is formed through the light guide plate, and the PCB may be stacked on the rear surface of the reflection plate.

The sealing material may be made of a material containing epoxy, and the backlight unit may further comprise a cover plate for closing a side opening of the case.

In another aspect of the present invention, a method of manufacturing the backlight unit comprises: a) integrally forming a case which has a side opening and an internal space for accommodating the stacked assembly of respective components, and a window which is placed on the front surface of the case, by a double injection manner; b) mounting the stacked assembly comprising a light guide plate for diffusing light emitted from the light source over the entire area and a reflection plate for reflecting light emitted from the rear surface of the light guide plate into the inner space through a side opening of the case; and c) closing the side opening of the case.

The step c) may comprise at least one of a process for closing the side opening 22 using the cover plate 80 and a process for sealing the side opening 22 by injecting a material containing epoxy into the side openings 22.

According to the backlight unit and method manufacturing the same of the present invention, it is possible to prevent the fine cracks of the soldering portion between the PCB and the electronic device during the ultrasonic welding process, and the progressive breakage of the backlight unit due to this in advance. Further, the assembling workability of the backlight unit can be greatly improved, so that the manufacturing cost can be greatly reduced.

DETAILED DESCRIPTION

The objects, features and advantages of the present invention will become more apparent from the exemplary embodiments shown in the accompanying drawings and the following detailed description.

First Embodiment of Backlight Unit

Figure 1:
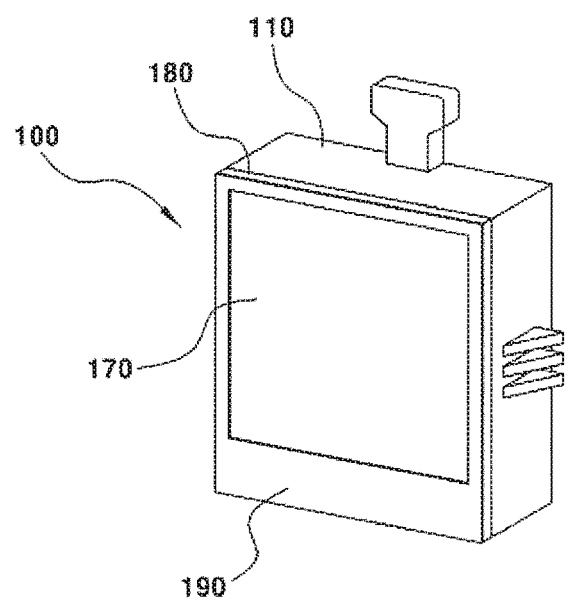
FIG. 1 is a perspective view of the backlight unit for an outside mirror according to the prior art.
Figure 2:
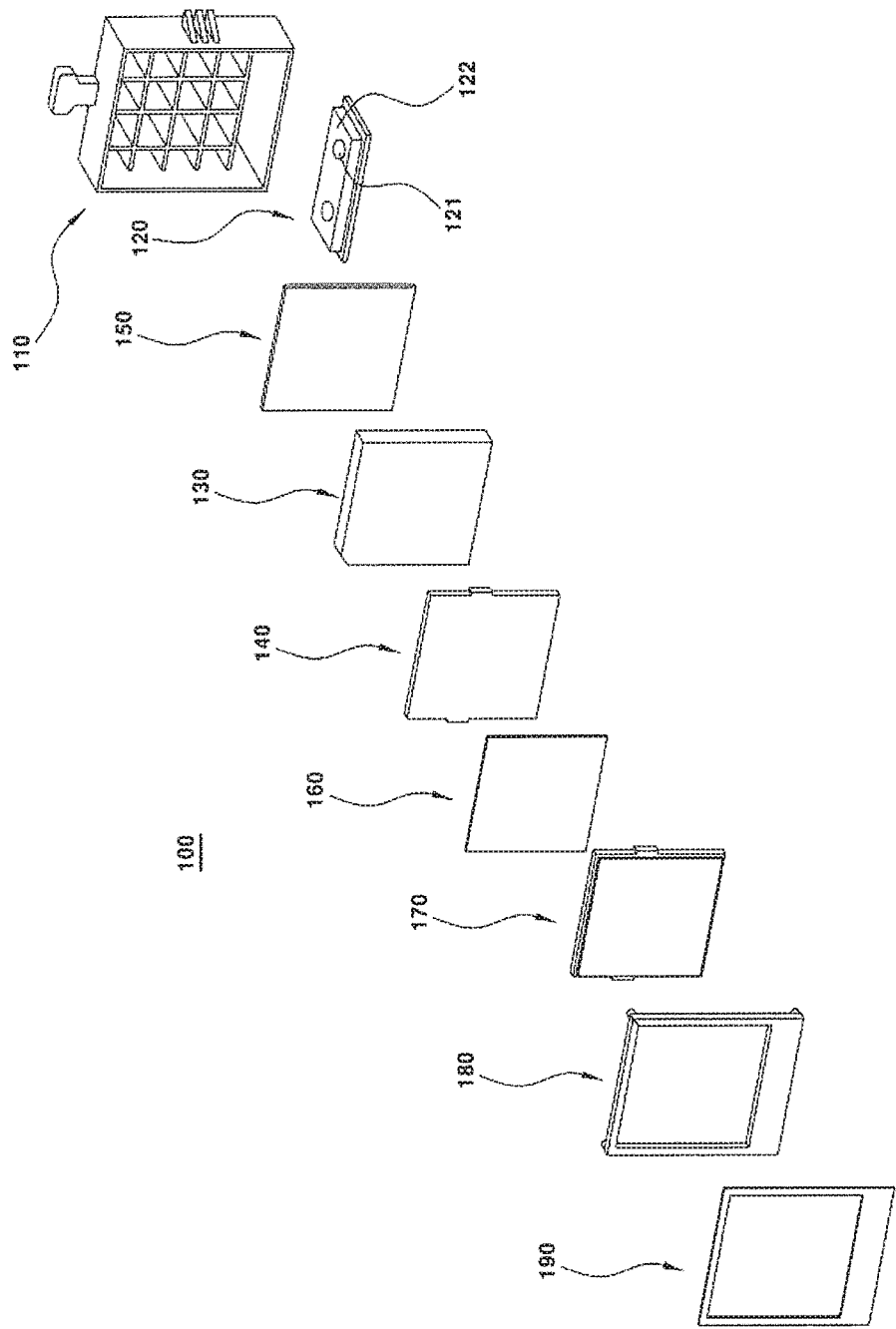
FIG. 2 is an exploded perspective view of the backlight unit for an outside mirror according to the prior art.
Figure 3:
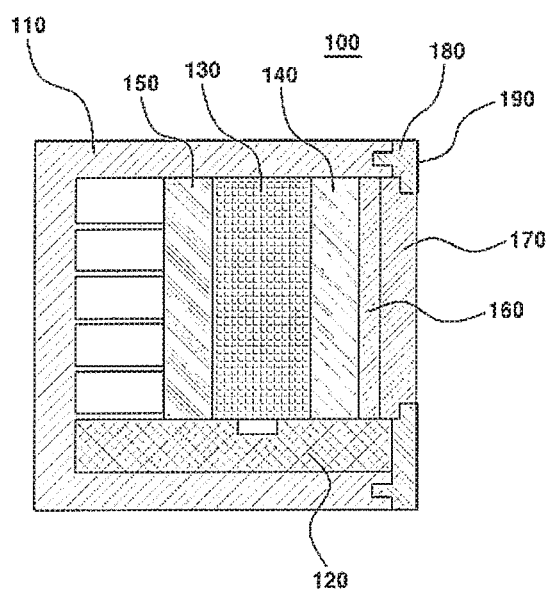
FIG. 3 is a cross-sectional view of the backlight unit for an outside mirror according to the prior art.
Figure 4:
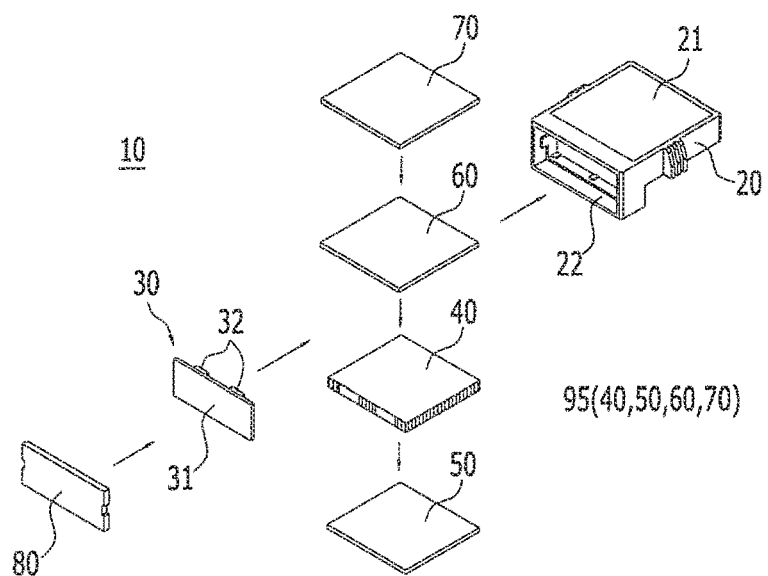
FIG. 4 is an exploded perspective view of the backlight unit according to a first embodiment of the present invention.
Figure 5:
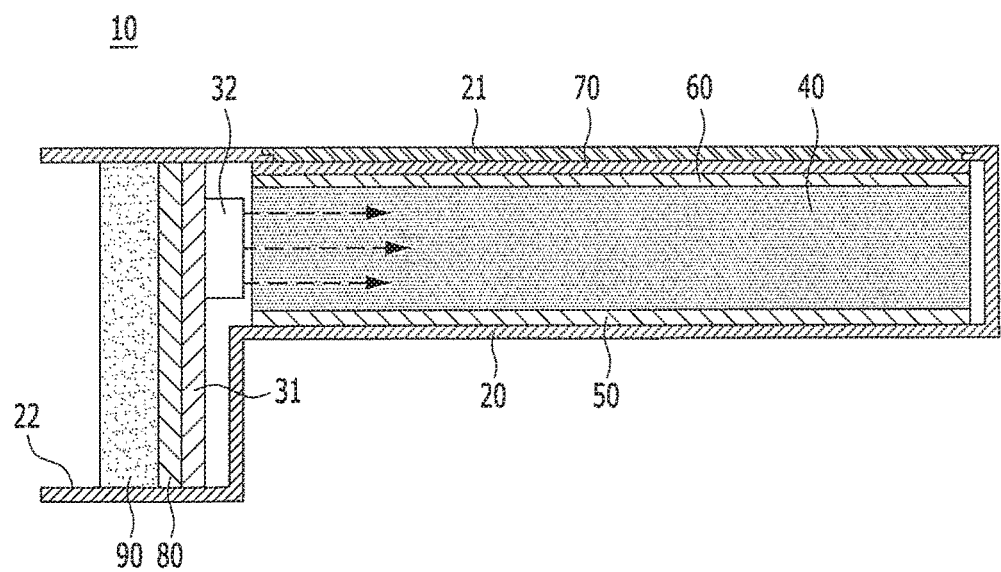
FIG. 5 is a cross-sectional view of the backlight unit shown in FIG. 4.

Hereinafter, a first embodiment of the present invention will be described with reference to FIGS. 4 and 5. FIG. 4 is an exploded perspective view of the backlight unit according to the first embodiment of the present invention. FIG. 5 is a cross-sectional view of the backlight unit shown in FIG. 4.

Referring to FIGS. 4 and 5, the backlight unit 10 according to the first embodiment of the present invention may comprise a case 20, a window 21, a light source unit 30, a light guide plate 40, a refection plate 50, a prism plate 60, a diffuser plate 70, a cover plate 80 and a sealing material 90.

The case 20 is a substantially rectangular parallelepiped-shaped component in which a space for accommodating the respective components are formed. On the front surface of the case 20, a window 21 of a transparent or a white color is integrally injection molded by a double injection manner. A side opening 22 for inserting the stacked assembly 95 composed by stacking the respective components 40, 50, 60 and 70 are formed on one side of the case 20.

Figure 6:
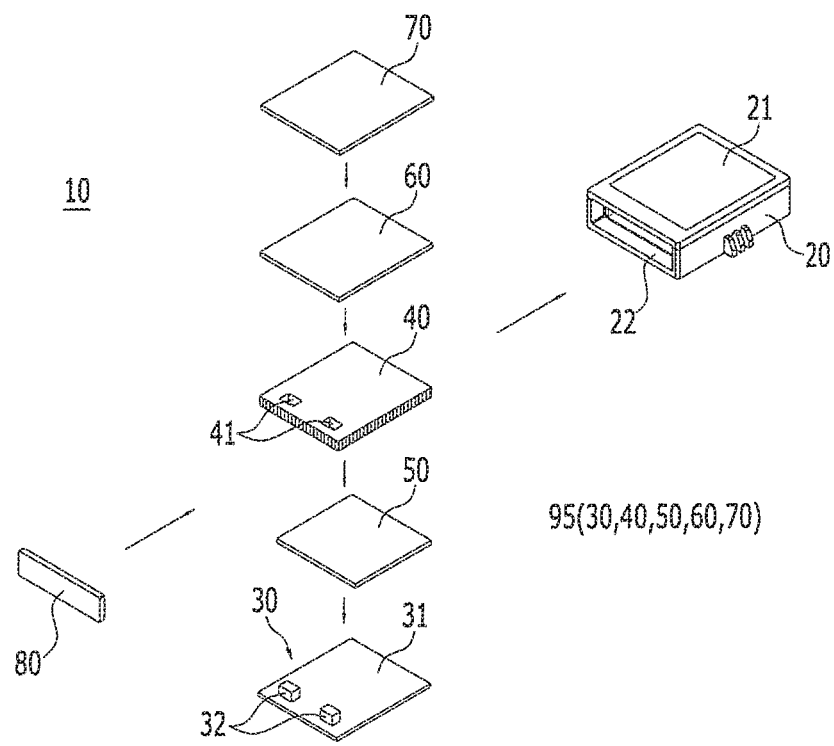
FIG. 6 is an exploded perspective view of the backlight unit according to a second embodiment of the present invention.

The light source unit 30 is mounted into the inner space of the case 20 and emits light when power is supplied to radiate the light toward the light guide plate 40. The light source unit 30 may comprise at least one LED 32 mounted on the PCB 31. However, the present invention is not limited to LEDs, and the other types of light sources that perform functions equivalent to LEDs may be used. As shown in FIG. 6, the LED (i.e., light source) 32 is configured such that light emitted therefrom is radiated in a direction perpendicular to the plane of the PCB 31.

The light guide plate 40 is a plate-shaped component that uniformly diffuses the light emitted from the light source unit 30 to the entire area of the light guide plate 40 to convert the point light source or the linear light source into the surface light source. The light guide plate 40 is placed on the upper portion of the light source unit 30 and mounted into the inner space of the case 20.

The light radiated from the light source unit 30 is incident into the light guide plate, and then the light incident into the light guide plate 40 is irregularly reflected by the surface pattern formed on the rear surface of the light guide plate 40, thereby uniformly diffused in the entire area of the light guide plate 40.

The reflection plate 50 is a plate-shaped component that is stacked on the rear surface of the light guide plate 40 and reflects light. The reflection plate 50 reflects light such that the light emitted from the rear surface of the light guide plate 40 faces the front surface of the light guide plate 40, thereby preventing loss of light.

The reflective tape is a component adhered to the edge of the light guide plate 40. The reflective tape reflects light emitted from the edge of the light guide plate 40, thereby preventing loss of light.

The prism plate 60 is a plate-shaped component placed in front of the light guide plate. The prism plate 60 controls the light incident from the front surface of the light guide plate 40 through refraction, reflection, concentration, or the like to increase the surface luminance. However, such a prism plate 60 is not an essential component necessarily to be provided in the configuration of the backlight unit 10.

The diffusion plate 70 is a component that is stacked on the front surface of the light guide plate, or on the front surface of the prism plate 60 when the prism plate 60 is provided. The diffusion plate serves to uniformly diffuse and pass the light emitted from the light guide plate 40 or the prism plate 60, thereby realizing more uniform brightness and color. However, such a diffusion plate 70 is not an essential component necessarily to be provided in the configuration of the backlight unit 10.

The window 21 is a component integrally formed on the front surface of the case 20 by a double injection manner on the front surface of the case 20. The window 21 serves to transmit light generated inside the case 20 to the outside while protecting respective components mounted inside the case 20.

The cover plate 80 is a component for closing the side opening 22 of the case 20 after respective components are mounted into the inner space of the case 20.

The sealing material 90 is a component for hermetically sealing the side opening 22 of the case 20 after respective components are mounted into the case 20. The sealing material may be formed by injecting a material containing epoxy into the side opening 22.

The backlight unit 10 according to the first embodiment of the present invention has the following advantages.

In the prior art, the PCB is mounted into the bottom case 110 and then the top case 180 and the bottom case 100 must be integrally fixed by ultrasonic welding. On the contrary, the case 20 and the window 21 are integrally injection molded by a double injection manner before the PCB 31 is mounted into the inner space of the case 20, and then respective components and the PCB are mounted into the inner space of the case 20 through the case opening 22 of the case 20. Therefore, according to the first embodiment of the present invention, it is possible to prevent fine cracks in a soldering portion between a PCB and an electronic device during the ultrasonic welding process, and progressive breakage of the backlight unit due to this in advance.

Further, a side opening 22 may be formed in the side surface of the case 20. Therefore, since respective components 40, 50, 60, 70 and 80 can be mounted into the inner space of the case 20 through its side opening 22 in the form of a stacked assembly 95, the assembling workability of the backlight unit 1 can be remarkably improved as compared with the prior art, so that the manufacturing cost can be also greatly reduced.

Second Embodiment of Backlight Unit

Next, a second embodiment of the present invention will be described with reference to FIGS. 6 and 7. In explaining the second embodiment of the present invention, the same configurations as those of the backlight unit 10 according to the first embodiment are not described in detail and only the configurations different from the backlight unit 10 according to the first embodiment will be described in detail.

FIG. 6 is an exploded perspective view of the backlight unit according to the second embodiment of the present invention. FIG. 7 is a sectional view of the backlight unit shown in FIG. 6.

Figure 7:
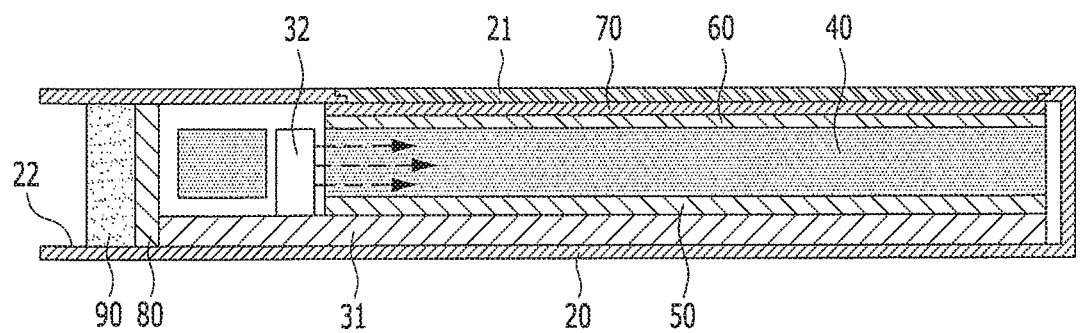
FIG. 7 is a cross-sectional view of the backlight unit shown in FIG. 6.

As shown in FIGS. 6 and 7, the light source unit 30 comprises at least one LED (i.e., light source) 32 mounted on the PCB 31. At this time, the LED 32 is configured to radiate light in a direction parallel to the plane of the PCB 31, as shown in FIG. 7.

At least one hole 41 for receiving at least one LED 32 is formed through the light guide plate 40, so that the PCB can be stacked on the light guide plate 40 with the reflection plate 50 interposed therebetween.

According to the second embodiment of the present invention, the PCB 31 may be mounted into the inner space 20 through the side opening 22 of the case 20 in the form of a lamination assembly 95 with other components 40, 50, 60, 70 and 80, so that the backlight unit 10 can be realized as an ultra-thin type.

(Manufacturing Method of Backlight Unit)

Now, a preferred embodiment of a method for manufacturing the backlight unit according to the present invention will be described with reference to FIG. 8.

Figure 8:
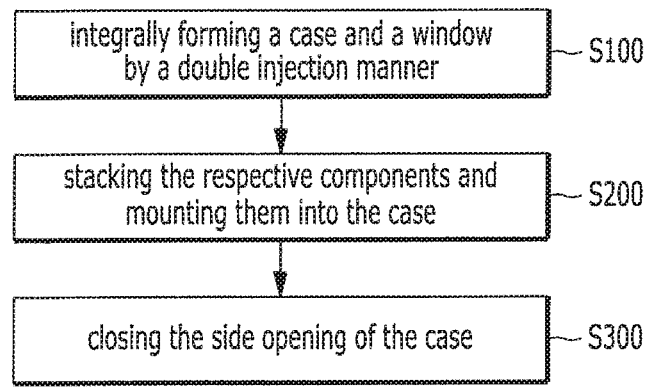
FIG. 8 is a flowchart illustrating a manufacturing process of the backlight unit according to the present invention.

FIG. 8 is a flowchart illustrating manufacturing processes of the backlight unit according to the present invention. Referring to FIG. 8, a method of manufacturing the backlight unit 10 according to the present invention comprises a step S100 of integrally forming a case and a window by a double injection manner, a step S200 of stacking component parts and mounting them in a case, and a step S300 of sealing the side opening of the case.

The step S100 of integrally forming the case and the window by the double injection manner is a step of integrally forming a case 20 of a substantially rectangular parallelepiped shape having a side opening and an internal space for accommodating the respective components, and a window 21 of a transparent or a white color placed on the front face of the case, by using a double injection manner, that is, a method of injection molding a product in one cycle using a resin of different kind or different color.

The step S200 of stacking the respective components and placing them in the case is a step of mounting the respective components 30, 40, 50, 60 and 70 of the backlight unit 10 in the form of a stacked assembly 95 into the inner space through the side opening 22 of the case 20.

The step S300 of sealing the side opening of the case is a step of sealing the side opening 22 of the case 20 with respective components mounted into the case 20, may comprise at least one of a process for closing the side opening 22 using the cover plate 80 and a process for hermetically sealing the side opening 22 by injecting the material containing epoxy into the side opening 22.

According to the method of manufacturing the backlight according to the present invention, before the respective components of the backlight unit 10 are mounted into the case 20 through the side opening 22 of the case 20 in the form of the stacked assembly 95, the window 21 is integrally formed on the front surface of the case 20 by a double injection manner. Therefore, it is possible to prevent fine cracks in a soldering portion between a PCB and an electronic device during the ultrasonic welding process, and progressive breakage of the backlight unit due to this in advance. Further, the assembling workability of the backlight unit can be greatly improved, so that the manufacturing cost can be greatly reduced.

Although the preferred embodiments of the present invention have been described above with reference to the accompanying drawings, the present invention is not limited to the specific embodiments described above. It will be apparent to those skilled in the art that various modifications and variations can be made in the present invention without departing from the spirit of the invention, and those skilled in the art will recognize that such modifications or variations are also within the scope of the invention.

What is claimed is:

1. A backlight unit comprising:
   a case 20 provided with an inner space for accommodating a stacked assembly of respective components, and having a side opening 22 through which the stacked assembly 95 can be inserted;
   a light source unit 30 mounted into the inner space of the case 20 and capable of emitting light when power is supplied;
   a cover plate 80 for closing a side opening 22 of the case 20; and
   a sealing material 90 sealing the side opening 22 of the case 20,
   wherein the stacked assembly 95 comprises:
   a light guide plate 40 for diffusing, the light emitted from the light source unit 30 across the entire area thereof; and
   a reflection plate 50 stacked on the rear surface of the light guide plate 40 and reflecting, the light emitted from the rear surface of the light guide plate toward the front surface of the light guide plate,
   wherein the sealing material 90 is made of a material containing epoxy.

2. The backlight unit according to claim 1, the stacked assembly 95 further comprising a prism plate 60 stacked on the front surface of the light guide plate 40 and increasing a surface luminance of light emitted from the front surface of the light guide plate.

3. The backlight unit according to claim 1, the stacked assembly 95 further comprising a diffusion plate 70 stacked on the front surface of the light guide plate and uniformly diffusing light emitted from the front surface of the light guide plate.

4. The backlight unit according to claim 1, further comprising a reflective tape adhered to an edge of the light guide plate 40 and reflecting light emitted from the edge of the light guide plate.

5. The backlight unit according to claim 1, further comprising a window formed integrally with the case on a front surface of the case by a double injection manner.

6. The backlight unit according to claim 1, the light source unit 30 further comprising a PCB (Printed Circuit Board) and at least on light source 32 mounted on the PCB, wherein the light source 32 is configured to radiate light in a direction perpendicular to the plane of the PCB.

7. The backlight unit according to claim 1, the light source 30 comprising a PCB and at least on light source 32 mounted on the PCB 31, wherein the light source 32 is configured to radiate light in a direction parallel to the plane of the PCB, and at least one hole 41 for receiving the at least one light source 32 is formed through the light guide plate 40, and the PCB 31 is stacked on the rear surface of the reflection plate 50.

8. A method of manufacturing a backlight unit comprising:
   a) integrally forming a case 20 which has a side opening 22 and an internal space for accommodating a stacked assembly 95 of respective components, and a window 21 which is placed on the front surface of the case, by a double injection manner;
   b) mounting the stacked assembly 95 comprising a light guide plate 40 for diffusing light emitted from the light source 30 over the entire area and a reflection plate 50 for reflecting light emitted from the rear surface of the light guide plate into the inner space through a side opening 22 of the case 20; and
   c) closing the side opening 22 of the case 20,
   wherein the step c) comprises at least one of a process for closing the side opening 22 using the cover plate 80 and a process for sealing the side opening 22 by injecting a material containing epoxy into the side opening 22.

* * * * *